Aug. 16, 1966  T. P. HECKMAN  3,266,112
PERMANENT MAGNET FASTENER
Filed May 14, 1964  4 Sheets-Sheet 1
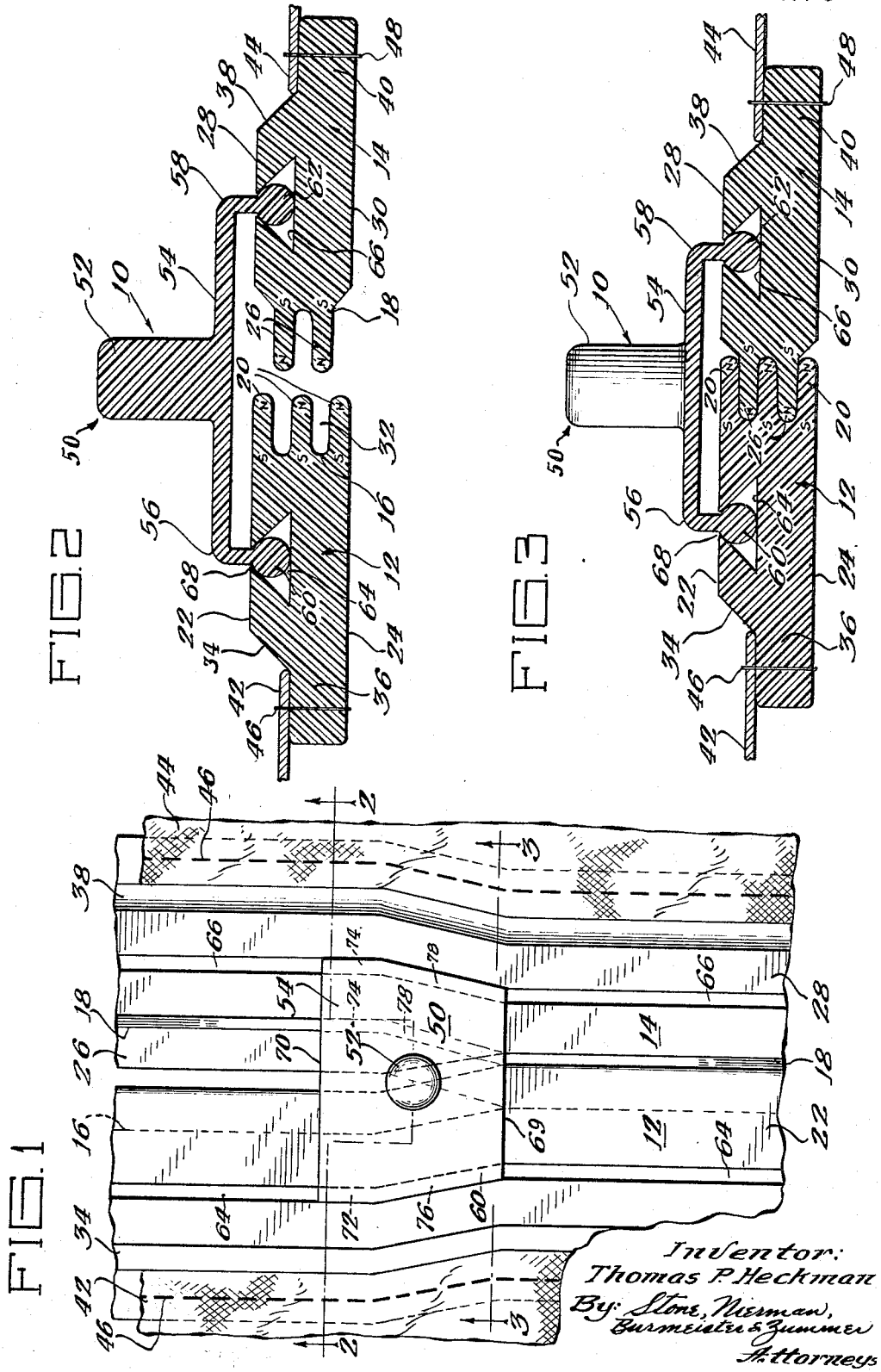
Inventor:
Thomas P. Heckman
By: Stone, Nieman,
Burmeister & Zummer
Attorneys Aug. 16, 1966 T. P. HECKMAN 3,266,112
PERMANENT MAGNET FASTENER
Filed May 14, 1964 4 Sheets-Sheet 3
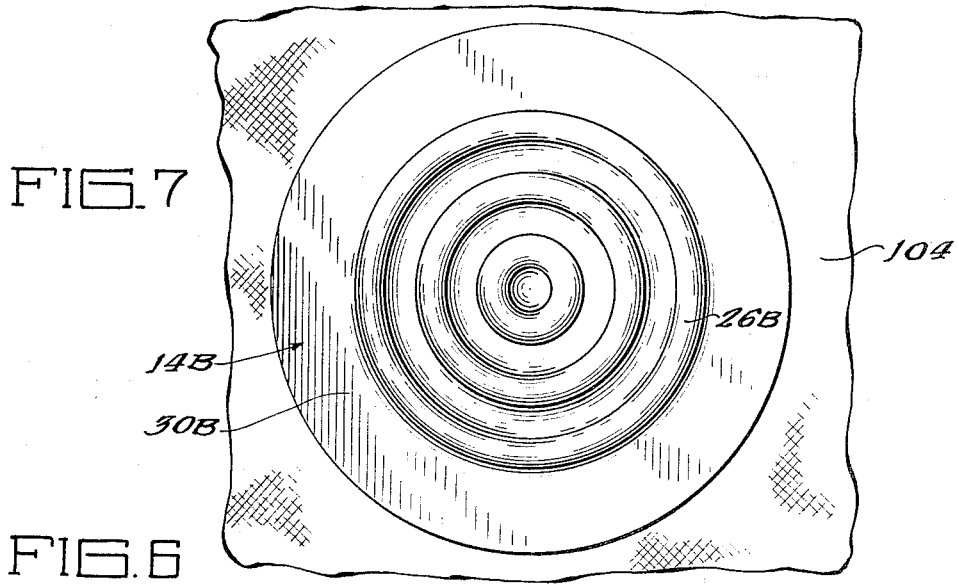
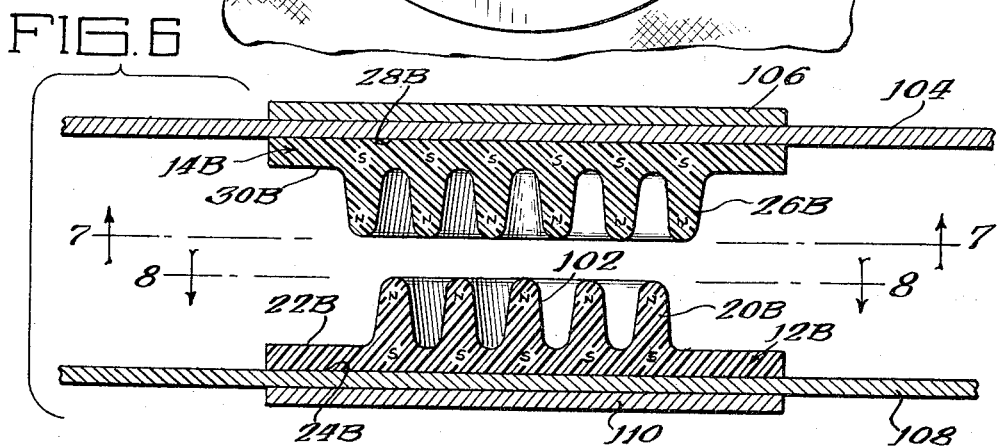
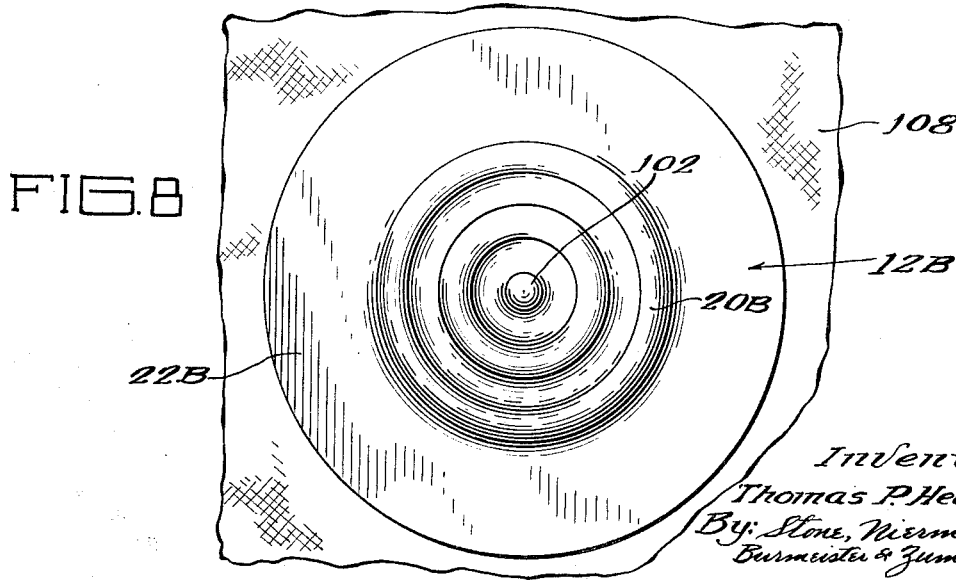
Inventor:
Thomas P. Heckman
By: Stone, Nierman,
Burmeister & Zummer
Attorneys

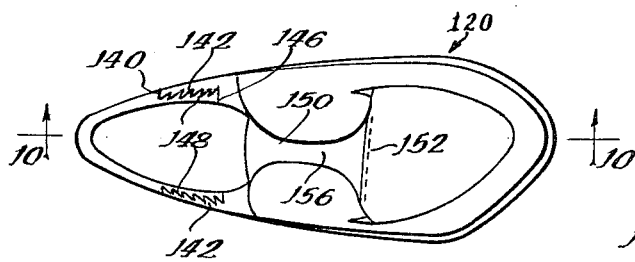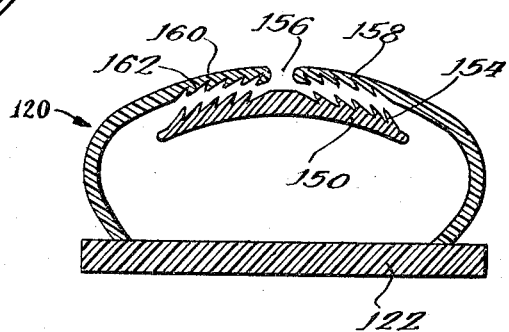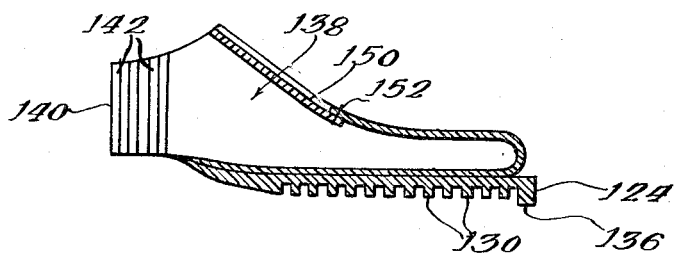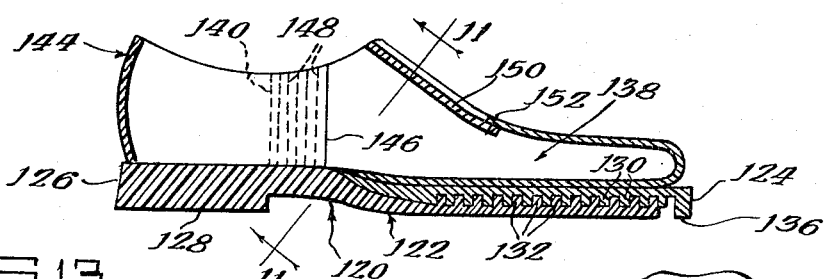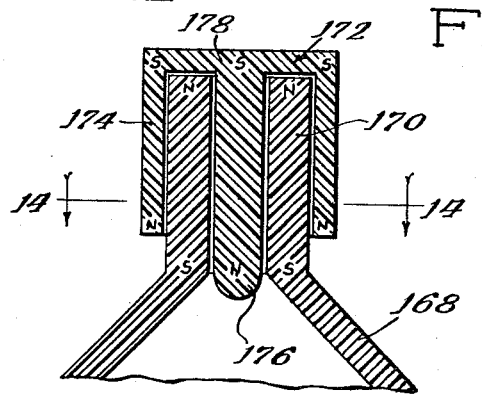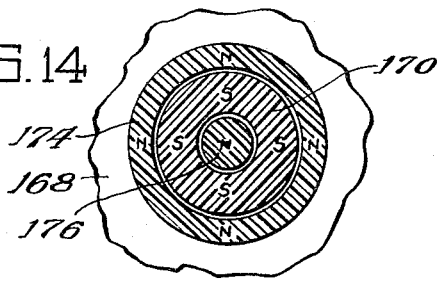

United States Patent Office 3,266,112
Patented August 16, 1966

3,266,112
PERMANENT MAGNET FASTENER
Thomas P. Heckman, 533 Edgewood Road, Lombard, Ill.
Filed May 14, 1964, Ser. No. 367,385
15 Claims. (Cl. 24—201)

The present invention relates to fasteners for holding together two separate members, particularly for securing together two separate members of cloth, leather or plastic. In particular, the present invention relates to closures for cloth articles, clothing, shoes, bottles and the like.

Buckles, clasps, bows and zippers have long been used for fastening two members together in a releasable condition. Such closures are known to commonly fail as a result of wear over a period of time. Buckles and clasps are relatively easily broken, and zippers are relatively easily jammed. Further, buckles, clasps, and zippers do not provide a tight seal between the members which are secured together. It is an object of the present invention to provide a closure for the applications of buckles, clasps, and zippers and the like which is less susceptible to failure as a result of wear, less susceptible to breakage, and which provides a seal between the members being secured together to prevent the passage of dust and the like.

It is an object of the present invention to provide a closure of improved construction using magnetically polarized materials. Magnetic closures have been suggested prior to the present invention, but such closures have suffered from the disadvantage that such closures tend to be self-closing, even when undesired, due to the magnetic attraction between the two members of the closure. It is therefore a further object of the present invention to provide a closure utilizing two members which are permanently magnetized which do not attract each other when physically separated from each other.

Closures of the type set forth in this specification have wide application. They may be employed in the form of zippers for clothing and cloth articles such as tents. It is an object of the present invention to provide an improved magnetic zipper.

It is also an object of the present invention to provide a closure which provides a substantial dust barrier between the interconnected members. Such a closure is particularly applicable to adjustable shoes and bottles, and it is an object of the present invention to provide closures for these items.

The present invention will be more readily appreciated from a further consideration of this specification, particularly when viewed in light of the drawings, in which:

FIGURE 1 is a plan view of a magnetic zipper constructed according to the teachings of the present invention;

FIGURE 2 is a sectional view of the magnetic zipper taken along the lines 2—2 of FIGURE 1;

FIGURE 3 is a sectional view taken along the line 3—3 of FIGURE 1;

FIGURE 6 is a central sectional view of a magnetic button which constitutes still a further embodiment of the present invention;

FIGURE 7 is a plan view of the upper member of the magnetic button illustrated in FIGURE 6;

FIGURE 8 is a plan view of the lower member of the magnetic button illustrated in FIGURE 6;

FIGURE 9 is a plan view of a shoe employing magnetic closures which constitutes a still further embodiment of the present invention;

FIGURE 10 is a sectional view taken along the line 10—10 of FIGURE 9;

FIGURE 11 is a sectional view taken along the line 11—11 of FIGURE 10;

FIGURE 12 is a sectional view taken along the plane of FIGURE 10 illustrating one portion of the shoe illustrated in FIGURES 9 through 12;

FIGURE 13 is a longitudinal sectional view of a bottle closure which constitutes a still further embodiment of the present invention; and FIGURE 14 is a sectional view of the bottle closure taken along the line 14—14 of FIGURE 13.

Figure 4:
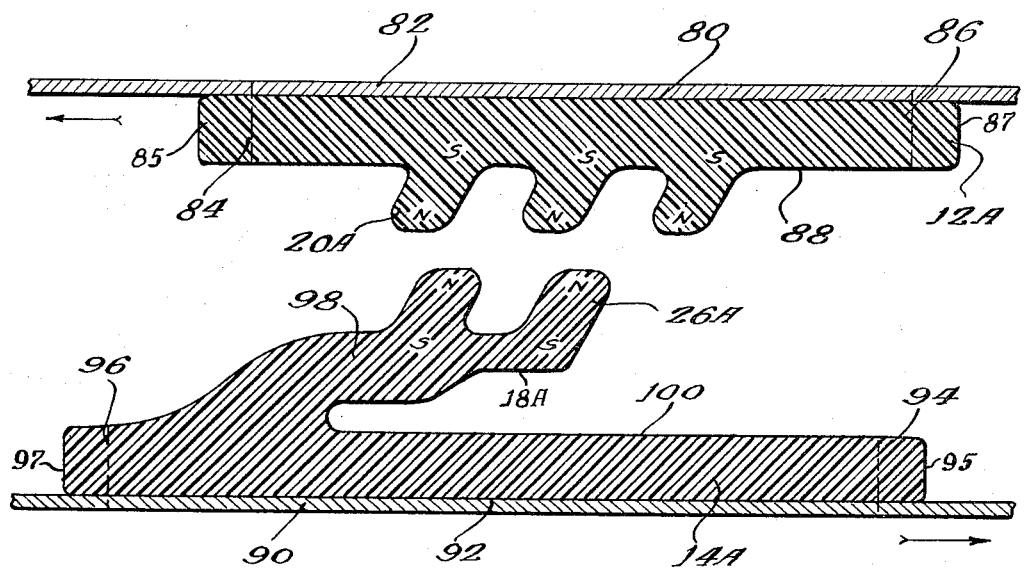
FIGURE 4 is a transverse sectional view of a modified type of magnetic zipper which constitutes a further embodiment of the present invention, FIGURE 4 illustrating the zipper in open condition.

FIGURES 1 through 3 illustrate a zipper constructed of magnetic material which constitutes one of the embodiments of the present invention. The zipper is designated 10 and is formed by two elongated strips 12 and 14 of plastic material. One edge 16 of the strip 12 is illustrated confronting one edge 18 of the strip 14, and the edge 16 has a plurality of spaced outwardly extending ribs 20. The ribs 20 are parallel to each other and to the upper surface 22 and lower surface 24 of the member 12. Further, the ribs are spaced from each other by common distance and have a thickness in a plane perpendicular to the surfaces 22 and 24 approximately equal to the distance between ribs.

The member 14 also has a plurality of bars 26 which extend outwardly from the edge 18 thereof. The bars 26 are also disposed in planes parallel to the upper surface 28 and lower surface 30 of the member 14. Additionally, the bars 26 extend from the member 14 approximately the same distance as the ribs 20 extend from the member 12, and the thickness of the bars 26 measured normal to the surfaces 28 and 30 is approximately the same as the thickness of the ribs 20 measured normal to the surfaces 22 and 24 of the member 12. The ribs 20 form grooves 32 therebetween which will snugly receive the bars 26.

The members 12 and 14 are constructed of magnetically polarizable material of plastic form. Such material contains particles of magnetic material, such as iron, nickel and barium ferrite distributed throughout a binder of plastic, such as polyethylene, polyurethane, or polyvinyl chloride. A commercial product of this type is the product of the B. F. Goodrich Company called "Koroseal Flexible Magnetic Strip." The members 12 and 14 are flexible in that they will bend readily in a direction normal to the upper and lower surfaces thereof, and also flexible in that they will bend in a direction parallel to these surfaces. In addition, they may be magnetically polarized and become permanently magnetically polarized.

Each of the ribs 20 and each of the bars 26 is magnetically polarized with vectors disposed along the transverse axes thereof, that is, each of the ribs 20 is magnetically polarized with one pole disposed in the member 12 adjacent to the edge 16 thereof and opposite poles located adjacent to the edge of each of the ribs 20 remote from the edge 16 of the member. In the figures, the poles adjacent to the edge 16 of the member 12 are designated "S" for south, and the poles remote from the edge 16 of the member 12 are designated "N" for north. In like manner, the bars 26 of the member 14 are magnetically polarized in the transverse direction so that one pole is disposed adjacent to the edge 18 of the member 14 and an opposite pole is disposed in each bar 26 near the edge thereof remote from the edge 18 of the member 14. Further, the remote edges of the bars 26 (relative to the edge 18) are polarized with the same polarity as the remote edges (relative to the edge 16) of the member 12 so that a magnetic force tends to repel the member 12 from the member 14 when the ribs 20 are spaced from the bars 26, as in FIGURE 2. However, when the bars 26 are forced into the grooves 32 formed by the ribs 20, then the poles located at the remote edges of the bars 26 are disposed closer to the poles of the member 12 located adjacent to the edge 16 thereof than to the poles of the member 12 located at the edges of the ribs 20 remote from the edge 16, so that magnetic attraction occurs between the opposite poles of the ribs 26 and the poles adjacent to the edge 16 of the member 12. In like manner, the poles disposed at the remote edges of the ribs 20 of the member 12 are disposed closer to the poles of the member 14 disposed adjacent to the edge 18 thereof than to the poles located at the remote edges of the bars 26, and therefore a magnetic attraction occurs between the poles disposed at the remote edges of ribs 20 and the poles of the member 14 located adjacent to the edge 18 thereof. The magnetic attractions thus established securely hold the member 12 to the member 14. Any number of ribs 20 and bars 26 may be employed, however, the inventor has found that the use of three ribs and two bars provide adequate attraction between the members 12 and 14 and avoids a great thickness measured between the upper surface 22 and lower surface 24 of the member 12 or the upper surface 28 and the lower surface 30 of the member 14.

The member 12 has a step 34 in the upper surface 22 thereof to provide a relatively thin portion 36 remote from the edge 16. In like manner, the member 14 has a step 38 remote from the edge 18 to provide a relatively thin portion 40 remote from the edge 18. These thin portions 36 and 40 are to facilitate attaching of the members 12 and 14 to the materials which are to be interconnected by the magnetic zipper, one layer of material 42 being illustrated in abutment with the upper surface of the portion 36 of the member 12 and a second layer 44 being illustrated in abutment with the upper surface 28 of the portion 40 of the member 14. The layers 42 and 44 may be of cloth, canvas, leather, paper, or the like, and may be secured to the portions 36 and 40 by any convenient means, such as cement, or thread forming a sewing seam, such as illustrated at 46 for the portion 36 and 48 for the portion 40.

Since the member 12 and the member 14 are repelled when the ribs 20 are spaced from the bars 26, a considerable force is required in order to force the bars 26 between the ribs 20. A latch 50 is employed for this purpose. The latch 50 has a post 52 extending from a flat plate 54, the post 52 facilitating movement of the latch 50. The plate 54 is provided with right angle bends 56 and 58 at two of its opposite edges, and these edges terminate in rails 60 and 62. The rail 60 is disposed in a groove 64 located in the upper surface 22 of the member 24, and the rail 62 is located in a groove 66 in the upper surface 28 of the member 14. The groove 64 is disposed parallel to the edge 16, and the groove 66 is disposed parallel to the edge 18. The grooves 64 and 66 have restricted mouths 68, and the rails 60 and 62 have circular cross-sections measured in a direction normal to the axis of the grooves 64 and 66. The cross-sections of the rails 60 and 62 have a greater diameter than the width of the mouths 68, so that the rails 60 and 62 are translatedly secured within the grooves 64 and 66.

The plate 54 has two parallel edges 69 and 70 which are normal to the edges 16 and 18 of the members 12 and 14, and the rails 60 and 62 extend between the ends of these edges 69 and 70. The rails 60 and 62 have a first straight portion extending normally from the edge 70 designated 72 and 74, respectively, and the straight portions 72 and 74 are parallel to each other and spaced a sufficient distance that the bars 26 are spaced from the ribs 20 in this region due to guiding of the rails 60 and 62 within the grooves 64 and 66.

The rail 60 has a second straight portion 76 extending between one end of the straight portion 72 and the edge 69 of the plate 54, and the rail 62 has a second straight portion 78 extending between one end of the straight portion 74 and the plate edge 69. These second straight portions 76 and 78 are disposed at an acute angle to each other and terminate at the edge 69 spaced from each other by a distance which requires the bars 26 to be disposed within the grooves 32 of the member 12. As a result, translation of the latch 50 in one direction forces the bars 26 of the member 14 between the ribs 20 of the member 12, and translation of the latch 50 in the reverse direction forces the bars 26 from the grooves 32 to open the magnetic zipper.

Figure 5:
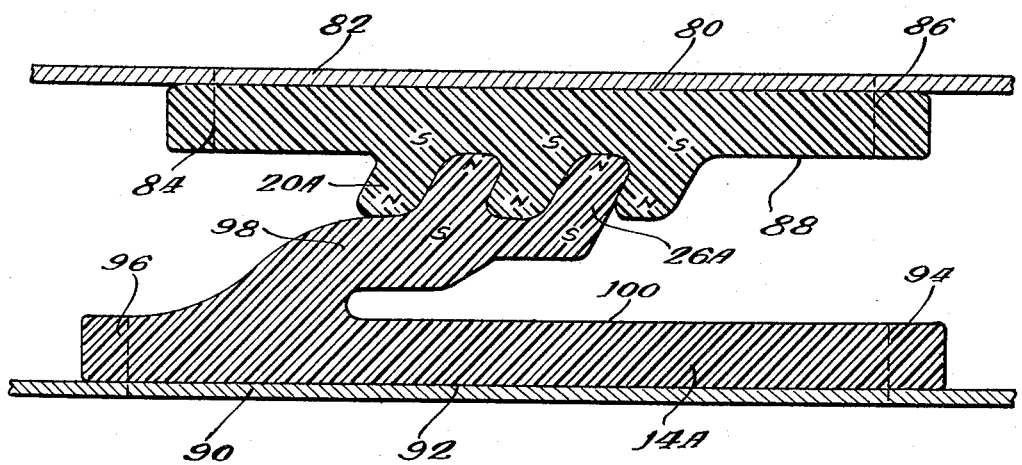
FIGURE 5 is a transverse sectional view taken along the same plane as FIGURE 4 illustrating the zipper of FIGURE 4 in closed condition.

In the embodiment of FIGURES 1 through 3, the layers 42 and 44 which are secured to the member 12 and 14 are generally disposed in planes parallel to the planes of the ribs 20 and the bars 26. In the embodiment of FIGURES 4 and 5, this is not true. A first member 12A is provided with a plurality of outwardly extending ribs 20A. The member 12A is elongated and has a flat upper surface 80 which may be secured to a sheet of material, such as a layer of cloth 82, either by cementing, or by rows of stitching 84 or 86 along the edges 85 and 87. The ribs 20A extend from the lower surface 88 of the member 12A in parallel planes disposed at an acute angle to the surface 80.

The closure also includes a second member 14A which is provided with two outwardly extending bars 26A. The member 14A is also secured to a sheet of material, such as a layer of cloth 90, on its lower surface 92, either by cement, or by rows 94 and 96 of stitching located at the edges 95 and 97 of the member 14A. The member 14A is also elongated, and the bars 26A are adapted to be disposed between the ribs 20A of the member 12A. The bars 26A are mounted on a leg 98 which extends from an upper surface 100 of the member 14A to provide a space for the human fingers to reach from the direction of 82 and apply a closing force from edge 18A of bar 26A and from surface 82 to cause the ribs and bars to engage, as shown in FIGURE 5, acting similar to rails 60 and 62 in FIGURES 1, 2, and 3. The leg 98 in addition provides an area for stitching and also provides a resilient coupling between the members 12A and 14A. The bars 26A are disposed at the same angle relative to the surfaces 92 and 100 as the ribs 20A are disposed relative to the surfaces 80 and 88 so that the bars 26A may fit snugly between the ribs 20A.

Members 12A and 14A are also constructed of magnetic material, identical to the members 12 and 14, and the ribs 20A are magnetized in a manner identical to the ribs 20. Also, the bars 26A are magnetized in a manner identical to the bars 26 of the first embodiment.

The construction of FIGURES 4 and 5 is particularly applicable to interconnecting two layers 82 and 90 which are under tension in opposite directions, the layer 82 being forced in the direction of the arrow indicated adjacent thereto and the layer 92 being forced in the direction of the arrow indicated adjacent to it. Since the ribs 20A and bars 26A are disposed at acute angles to the surfaces 80 and 100, respectively, the forces applied will tend to force the two members 12A and 14A into engagement. The members 12A and 14A are thus ideally suited for the closure mechanism of a belt as used to hold up a man's pants, and the like. A force applied in the opposite direction of the arrows will force the member 14A from the member 12A to unfasten the closure. As indicated above, the closure must be closed against repulsion of the magnetic field, and opened against attraction requiring force.

FIGURES 6, 7, and 8 illustrate a magnetic button closure. In this embodiment of the invention, a circular first member 12B constructed of a magnetic plastic material is provided with a circular central post 102 and a plurality of spaced circular concentric ribs 20B are disposed about the post 102. The ribs 20B are normal to the upper and lower surfaces 22B and 24B of the member 12B. Also, the ribs 20B and post 102 are permanently magnetized in a direction normal to the surfaces 22B and 24B and have one magnetic pole of the same magnetic potential adjacent to their edges remote from the surface 22B and another magnetic pole of the same magnetic potential approximately on the surface 22B.

The member 14B also is constructed of plastic magnetic material in the form of a circular disc, and is provided with a plurality of circular bars 26B extending coaxially and normally from a lower surface 30B. The bars 26B are adapted to be disposed snugly and slidably between the ribs 20B and the member 12B. The member 14B also has an upper surface 28B which is parallel to the lower surface 30B.

The bars 26B are magnetized along vectors normal to the surfaces 28B and 30B and have a first magnetic pole at their edges remote from the surface 30B and a second magnetic pole in the plane of the surface 30B. The magnetic poles of the ribs 20B remote from the surface 22B have the same magnetic potential approximately as the magnetic poles of the bars 26B remote from the surface 30B, thereby repelling the members 12B and 14B from each other where the ribs 20B are spaced from the bars 26B, as indicated in FIGURE 6. However, once the ribs 20B are forced between the bars 26B of the member 14B, the magnetic poles of the member 12B are attracted to the magnetic poles of the member 14B to hold the two members 12B and 14B in abutment with each other.

A layer of cloth, leather, paper or the like designated 104 may be cemented on the surface 28B of the member 14B, or sewed thereto, and a backing disc 106 is secured to the member 14B by stitching. Also, a layer 108 of cloth, paper, leather, or the like, is secured to the surface 24B of the member 12B by cement or stitching. A backing disc 110 is secured to the layer 108 by cement or by stitching through the layer 108 and the member 12B to align the backing disc 110 with the member 12B.

The two layers 104 and 108 may thus be secured together by forcing the ribs 20B of the member 12B between the bars 26B of the member 14B and removed by exerting force in the reverse direction.

FIGURES 9 through 12 illustrate the present invention applied to an adjustable shoe. The shoe, designated by the reference numeral 120 is adjustable in length and is provided with a magnetic latch for replacing the shoe strings conventionally used.

The shoe 120 has a sole 122 formed of a forward portion 124 and a rearward portion 126. The rearward portion is provided with a heel 128 as is conventional. The forward portion 124 of the sole 122 has a plurality of ribs 130 which extend therefrom away from the body of the shoe. The ribs 130 extend transversely across the forward portion 124 of the sole 122. The rearward portion 126 of the sole 122 also has a plurality of outwardly extending bars 132 which extend transversely across this portion of the sole. The bars 132 are slidably disposed between the ribs 130 in the manner of the embodiment of FIGURES 1 through 3. Also, the rearward and forward portions of the sole 122 are constructed of magnetic plastic such as the commercial product of DuPont known as Corfam impregnated with magnetic materials such as barium ferrite, and the ribs 130 are magnetically polarized in an identical manner to the ribs 20 of the embodiment of FIGURES 1 through 3, and the bars 132 are magnetically polarized in the identical manner of the bars 26 of FIGURES 1 through 3.

The forward portion 124 of the sole 122 may be separated from the rearward portion 126 by applying a force between the two portions. The forward portion may thus be adjusted along the longitudinal axis of the shoe to provide the desired shoe length, and thereafter the ribs 130 of the forward portion 124 forced between the bars 132 of the rearward portion 126 of the sole 122. Since the closure formed by the two magnetic portions of the sole 122 is extremely tight, very little dust or particles of other types can penetrate into the shoe through the interface between the forward portion 124 and the rearward portion 126. The forward portion 124 of the sole 122 is provided with a protruding scuff plate 136 which extends from the forward edge of the forward portion 124 to provide a common plane with the lower surface of the rearward portion 126 of the sole 122.

The forward portion 124 of the sole 122 is a part of a forward shoe assembly 138 which is shaped in the conventional form of the forward portion of a shoe. The assembly 138, however, terminates at both sides remote from the toe of the shoe in straight edges designated 140 which are disposed normal to the sole 122 and extend forwardly of the heel 128. The forward assembly 138 is provided with a plurality of spaced ribs 142 which extend inwardly therefrom in the region extending from the edge 142 forward.

The shoe 120 also has a heel assembly 144 which extends upwardly from the rear portion 126 of the sole 122, and the heel assembly 144 terminates remote from the heel of the shoe in edges 146 which is disposed approximately normal to the sole 122 and forward of the ribs 142 of the assembly 138. The outer surface of the heel assembly is also provided with a plurality of parallel spaced bars 148 which extend outwardly therefrom and are disposed between the ribs 142 of the forward assembly 138. Both the forward assembly 138 and the heel assembly 144 are constructed to have magnetically polarizable materials and the ribs 142 are polarized in the manner of the ribs 20 of FIGURES 1 through 3 and the bars 148 are polarized in the manner of the bars 26 of FIGURES 1 through 3. In this manner, magnetic attraction retains the forward assembly on the rearward assembly and prevents dirt and dust from entering the shoe through the interface between the forward and rearward assemblies.

The shoe illustrated in FIGURES 9 through 13 is provided with an inner tongue 150 which is secured to the forward assembly 138 at its end remote from the heel assembly 144 by cement or a row of stitching designated 152. The surface of the tongue 150 remote from the sole 152 is provided with a plurality of outwardly extending tooth-shaped ribs 154. The shoe forward assembly 138 is bifurcated confronting the strip by a slot 156 forming two sides 158 and 160. Each of the sides is provided with a plurality of tooth-shaped inwardly extending bars 162 which are adapted to mate with the ribs 154 of the tongue 150. The teeth forming the ribs 154 have surfaces essentially normal to the plane of the tongue 150 and facing the slot 156, so that the teeth-shaped ribs 154 of the tongue 150 and the teeth-shaped bars 162 of the sides 158 and 160 of the forward assembly 138 tend to remain in engagement due to the outward stress on the shoe from the foot of the wearer. In addition, the magnetic attraction between the ribs 154 of the tongue and the bars 162 of the sides 158 and 160 assures a permanent closure unit until forcefully separated.

FIGURES 13 and 14 illustrate the present invention applied to a closure for a bottle. The bottle 168 has a cylindrical outwardly extending neck 170 which is constructed on magnetically polarizable material. A cylindrical cap 172 is provided for closing the opening of the neck 170, and the cylindrical portion 174 of the cap 172 has an inner diameter sufficient to snugly accommodate the outer surface of the neck 170. In addition, the cap 172 is provided with an axial peg 176 which extends snugly into the neck 170.

The neck 170 is magnetically polarized along its cylindrical axis with one pole disposed at the mouth of the neck 170 and the other pole disposed at the junction of the neck 170 and the bottle 168 proper. In like manner, the cap 172 is magnetically polarized along the cylindrical axis of the portion 174 thereof with one pole at the disc portion of the cap, designated 178, and the other pole at the mouth portion of the cap. The peg 176 also has one of the other poles located at its end remote from the disc portion 178. The poles of the cap located in the disc portion 178 are opposite to the poles of the neck 170 confronting the disc portion 178 of the cap so that the cap is magnetically attracted to the neck 170. Also, the poles of the cap are opposite to the poles located at the junction of the neck and the body of the bottle 168 to provide attraction. Further, when the cap 172 is removed from the bottle 168, the poles of the cap will be opposed to the poles of the bottle to prevent the cap from inadvertently closing the mouth of the neck 170. The bottle and cap may be constructed of any of the magnetic materials described in this specification.

From the foregoing disclosure, those skilled in the art will readily devise many applications for the present invention beyond those herein set forth. Further, those skilled in the art may devise improvements on the present invention within the intended scope thereof. It is therefore intended that the scope of this invention be not limited by the foregoing specification, but rather only by the appended claims.

The invention claimed is:

1. A closure comprising a first and a second member of material capable of maintaining magnet polarization, the first of said members having a surface provided with a groove extending therein and the second of said members being provided with a ridge extending outwardly from a surface thereof adapted to mate with the groove and be removably accommodated therein, said ridge having a first magnetic pole of one polarity disposed therein remote from the surface of the second member and a second magnetic pole of opposite polarity to the first pole disposed adjacent to the surface of the second member, and said first member having a first magnetic pole adjacent to the groove and adjacent to the surface of the first member of the same polarity as the first pole of the second member and a second pole of opposite polarity to the first pole of said first member disposed adjacent to the groove and remote from the surface of said first member.

2. A closure comprising the combination of claim 1 wherein the first member is provided with a plurality of adjacent grooves and the second member is provided with a plurality of adjacent ridges adapted to be accommodated within the grooves.

3. A closure comprising the combination of claim 2 wherein the grooves of the first member and the ridges of the second member are generally parallel to each other.

4. A closure comprising the elements of claim 2 wherein the grooves of the first member and the ridges of the second member are disposed in a plurality of coaxial circles.

5. A closure comprising a first and a second member of material capable of maintaining magnetic polarization, the first of said members having a surface provided with a plurality of spaced grooves extending therein along parallel spaced planes and the second of said members being provided with a surface and a plurality of spaced ridges extending therefrom along parallel planes spaced by the same distance as the grooves, each ridge of the second of said members being adapted to be slidably disposed in a groove of the first member, each of said ridges being magnetically polarized with vectors disposed along axes disposed generally in the direction of extension of the ridges from the surface of the second member, and the portions of the first member disposed between grooves being magnetically polarized along vectors disposed generally in the direction of extension of the grooves into the surface of said first member, the axes of magnetic polarization of the first member being oppositely directed to the axes of polarization of the second member when the ridges of the second member are disposed in the grooves of the first member, whereby magnetic poles of the second member are disposed adjacent to opposite magnetic poles of the first member when the ridges of the second member are disposed within the grooves of the first member and magnetic poles of the second member are confronted by magnetic poles of like polarity when the ridges of the second member are separated from the grooves of the first member.

6. A closure comprising the combination of claim 5 wherein each of the grooves has two confronting surfaces parallel to the plane of said groove, and each of the ridges has two exterior surfaces parallel to the plane thereof, the surfaces of each ridge being adapted to snugly engage the surfaces of a groove to form a tight seal between the members.

7. A closure comprising the combination of claim 5 wherein the planes of the grooves of the first member and the planes of the ridges of the second member are disposed at an acute angle to the surfaces of said members.

8. A closure comprising the combination of claim 5 wherein the planes of the grooves of the first member and the planes of the ridges of the second member are disposed normal to the surfaces of said members.

9. A closure comprising the combination of claim 8 wherein the first and second member are constructed of compliant material.

10. A zipper comprising a first member having a first flat surface and a second flat surface normally disposed to the first flat surface, a second member having a third flat surface and a fourth flat surface normally disposed to the third flat surface, the first and second members being constructed of compliant material capable of retaining a magnetic polarization, the first surface of the first member being provided with a plurality of spaced grooves, each groove having a pair of confronting surfaces disposed parallel to the second surface of the first member, the third surface of the second member having a plurality of ridges equal in number to the grooves of the first member, each of said ridges have a pair of parallel surfaces disposed parallel to the fourth surface of the second member and spaced from each other by a distance slightly less than the distance between surfaces of the grooves, the ridges of the second member being adapted to be removably disposed within the grooves of the first member and the second surface of the first member and fourth surface of the second member being disposed in a common plane when the ridges of the second member are disposed in the grooves of the first member, the first member being magnetically polarized with poles of a first polarity disposed adjacent to the first surface adjacent to and on both sides of each groove and poles of a second and opposite polarity disposed remote from the first surface adjacent to and on both sides of each groove, the second member being magnetically polarized adjacent to the third surface thereof along each ridge and poles of the first polarity disposed in each ridge remote from said third surface of the second member, said first member having a slot in the second surface spaced from and parallel to the first surface and the second member having a slot in the fourth surface thereof parallel to and spaced from the third surface, a guide having two spaced rails, one of the rails being slidably disposed in the slot in the first member and the other rail being slidably disposed in the slot of the second member, said rails terminating at opposite ends on planes disposed normal to the first and third surfaces and being spaced at one end by a first distance equal to the distance between the slots in the first and second members when the ridges are disposed within the grooves, and said rails being spaced from each other at their opposite ends by a second distance greater than the first distance by at least the distance the ridges penetrate the slots when disposed therein, whereby translating the guide along the slots in one direction forces the ridges into the slots to close the zipper and translation of the guide in the reverse direction forces the ridges from the slots to open the zipper.

11. A zipper comprising the combination of claim 10 wherein the guide is provided with a plate extending between the rails and a handle extends outwardly from the plate.

12. A zipper comprising the elements of claim 10 wherein the rails of the guide have a parallel portion at their ends spaced by the second distance and linear portions extend from said parallel portions to the opposite ends thereof.

13. A zipper comprising the combination of claim 12 wherein each of the slots in the members have surface extending away from each other from the mouth of the slot, and the portion of each rail disposed in with a slot has a circular cross section of greater diameter than the mouth of said slot.

14. A shoe comprising a heel portion and a toe portion removably mounted on the heel portion along three connecting interfaces, one of said interfaces extending along the sole of the shoe and the other two interfaces extending upwardly from opposite sides of the sole, said interfaces having closures comprising the elements of claim 5.

15. A shoe comprising a heel portion and an interconnected toe portion, the toe portion having a tongue extending between two side flaps and confronting said flaps, said tongue being secured to each of said flaps by closures comprising the combination of claim 1.

References Cited by the Examiner

UNITED STATES PATENTS

| | | | |
|---|---|---|---|
| 2,438,231 | 3/1948 | Schultz | 317—201 X |
| 2,761,717 | 9/1956 | Mahlke. | |
| 2,959,832 | 11/1960 | Baermann | 24—201.2 |
| 3,102,314 | 9/1963 | Alderfer | 24—201.2 X |
| 3,166,771 | 1/1965 | Kline | 24—201.2 X |

FOREIGN PATENTS

| | | |
|---|---|---|
| 617,939 | 4/1961 | Canada. |
| 1,331,782 | 5/1963 | France. |

BERNARD A. GELAK, *Primary Examiner.*